Oct. 13, 1925. 1,556,620
D. L. LINDQUIST ET AL
CONTROL SYSTEM FOR ALTERNATING CURRENT MOTORS
Filed Nov. 30, 1923
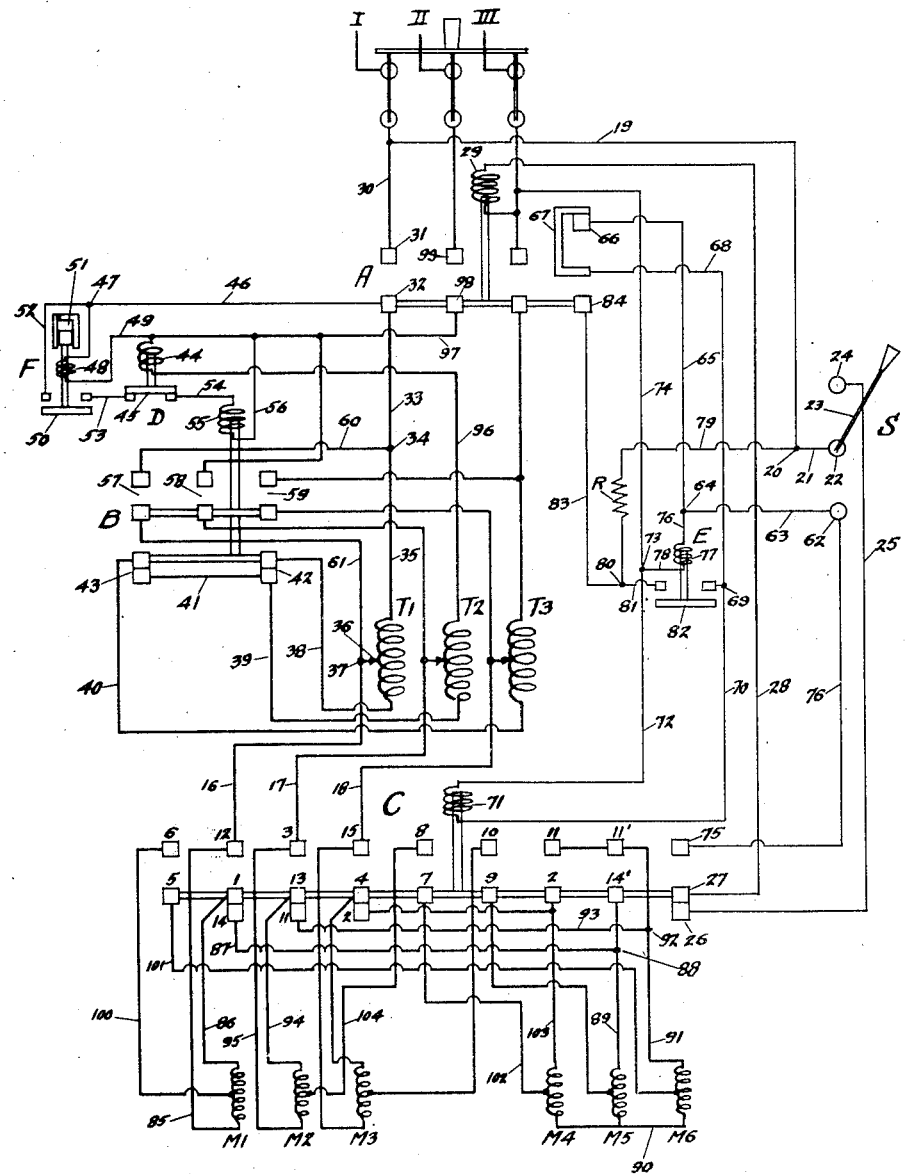
David L. Lindquist
Jacob D. Lewis
Inventors
By their Attorney
Levin H. Campbell Patented Oct. 13, 1925.

1,556,620

UNITED STATES PATENT OFFICE.

DAVID L. LINDQUIST, OF HARTSDALE, AND JACOB D. LEWIS, OF YONKERS, NEW YORK, ASSIGNORS TO OTIS ELEVATOR COMPANY, OF JERSEY CITY, NEW JERSEY, A CORPORATION OF NEW JERSEY.

CONTROL SYSTEM FOR ALTERNATING-CURRENT MOTORS.

Application filed November 30, 1923. Serial No. 677,696.

*To all whom it may concern:*

Be it known that we, DAVID L. LINDQUIST, subject of the King of Sweden, and JACOB D. LEWIS, citizen of the United States, residing, respectively, in Hartsdale and Yonkers, in the county of Westchester and State of New York, have invented a new and useful Improvement in Control Systems for Alternating-Current Motors, of which the following is a specification.

Our invention relates to a control system for a two speed alternating current motor and particularly to the starting and reversing of such a motor.

One of the objects of our invention is to provide a control system by which a two speed alternating current motor may be operated continuously, first in one direction at one speed and then in the other direction at the other speed. Such a control system is useful in connection with motor driven reciprocating apparatus, such as planers, in which it is required to have continuous operation, first in one direction and then in the other, and in which it is desirable to have one speed in one direction and another speed in the other direction.

Another object of our invention is to provide means for accelerating the motor at each reversal of rotation in such a way that the torque of the motor is not interrupted during the starting period.

A still further object of our invention is to provide a control system in which the switch for reversing and changing the speed of the motor is not called upon to open a circuit in which current is flowing at the time of operating the switch.

We accomplish these objects by a control system in which the motor is connected to give the desired speed and the desired direction of rotation by one means previous to the closing of the circuit from the supply lines to the motor by another means, both of these means being controlled by one master switch. An auto-transformer in a preferred form of the invention, is so connected that it automatically is thrown in circuit when the motor is started and at each reversal.

The following specification and accompanying drawing give more in detail one arrangement of circuits and apparatus that may be used to accomplish the objects of our invention.

The apparatus shown consists of main line switch A, accelerating magnet switch B, motor control switch C for changing the number of poles and reversing the direction of rotation of the motor, series relay D, relay E, dash pot relay F, resistance R, single pole double throw knife switch S constituting the master switch, auto-transformers $T^1$, $T^2$ and $T^3$, and motor stator windings shown diagrammatically in six groups, $M^1$, $M^2$, $M^3$, $M^4$, $M^5$ and $M^6$. The rotor of the motor may be any well known type but is omitted from the drawing as it has no bearing on this invention.

The windings $M^1$, $M^2$, $M^3$, etc. are intended to illustrate the stator windings of a single winding two speed motor having a ratio of speeds of two to one. In such motors certain leads are brought from the stator windings to a pole changing switch, the purpose of which is to re-arrange groups of coils in such a way that the number of poles with the switch in one position corresponds to one speed and with the switch in the other position the number of poles corresponds to the other speed. The application of J. D. Lewis, induction motor, filed October 27, 1919, Serial Number 333,490, and patented May 27, 1924, Number 1,495,420, discloses in detail the motor construction schematically illustrated in the accompanying drawing of this present application.

In our present invention, the switch C in addition to changing the number of poles in the motor is so arranged with respect to the leads from the motor that the direction of rotation of the motor is reversed whenever the number of poles is changed. The switch C has three pairs of main breaking contacts 1 and 14, 13 and 11, 4 and 2, and eight pairs of main making contacts 6 and 5, 12 and 1, 3 and 13, 15 and 4, 8 and 7, 10 and 9, 11 and 2, 11' and 14' and also one pair of auxiliary breaking contacts 27 and 26 and one pair of auxiliary making contacts 75 and 27. The auxiliary contacts are used in the control circuits as will be described below. The main contacts are used to connect the various groups of stator coils to give the two different numbers of poles and both directions of rotation. When switch C is de-energized as shown, the motor windings are connected for one number of poles, that is for one speed, and for one direction of rotation; while when switch C is energized, the motor windings are connected for another number of poles, that is for another speed, and for the other direction of rotation. Wires 16, 17, and 18 are the three supply lines leading to switch C.

The switch S is the master or operating switch and may be a single pole double throw knife switch as shown or this switch may be so arranged that it will be automatically operated at the limits of travel of a reciprocating apparatus (not shown) to be controlled. When this switch is closed one way, the motor will be connected, started and run at one speed in one direction and when closed the other way, the motor will be connected, started and run at the other speed in the other direction.

The following detail description of the operation will first deal with the operation of the control system as a result of switch S being closed one way; and then as a result of switch S being closed the other way; and finally with the operation of the control system when switch S is thrown quickly from one closed position to the other.

Assuming that the switch S is closed so that blade 23 contacts with contact 24 for slow speed operation and rotation of the motor in one direction, a circuit for the coil of the main line magnet switch A is completed as follows: from line I, by wire 19, junction point 20, by wire 21, contact 22, switch blade 23, and contact 24 of switch S, by wire 25, contacts 26 and 27, now closed, of switch C, by wire 28, coil 29 of switch A, to line III. The coil 29 is thereby energized and switch A closes its contacts, admitting current at a voltage lower than that of the lines to the motor as follows: from line I, by wire 30, through contacts 31 and 32, now closed, of switch A, by wire 33, junction 34, by wire 35, through part of auto-transformer winding T¹ to tap 36, junction 37, by wire 16, contact 12 of switch C, by wire 85, through stator windings M⁴, by wire 86, contacts 1 and 14 of switch C, by wire 87, junction point 88, by wire 89, through stator windings M⁵, by wire 90, through stator windings M⁶, by wire 91, junction point 92, by wire 93, contacts 11 and 13 of switch C, by wire 94, through stator windings M³, by wire 95, contact 3 of switch C, by wire 17, through part of auto-transformer T², by wire 96, coil 44 of switch D, by wire 97, contacts 98 and 99 of switch A, to line II.

Similar circuits can be traced for the other two circuits to the motor. The three auto-transformers are star connected through wires 38, 39, 40 and 41, and contacts 42 and 43 of switch B, now de-energized. The motor is now operating on a voltage corresponding to the tap on the auto-transformer. This tap may be adjusted to suit the starting characteristics required but it is not intended that this tap should be variable during the starting period.

In series with line II to the motor is coil 44 of series relay D. This relay is so designed that its contact will be open whenever the current flowing through its coil exceeds a predetermined amount and will close when the current falls below the predetermined amount. When the switch A closes, this relay is energized sufficiently by the starting current of the motor to cause it to open its contact 45, which contact is in series with the coil of switch B. As a result of the closing of switch A, the coil of switch F is also energized as follows: from line I, by wire 30, contacts 31 and 32 on switch A, by wire 46, junction point 47, through coil 48 of switch F, by wire 49, by wire 97, contacts 98 and 99 of switch A, to line II. The relay switch F will then close its contact 50 against the action of dash pot 51. Dash pot 51 is so constructed that the switch has a definite time interval for closing its contact and this time interval is only sufficient to permit of relay D operating to open its contact before switch F closes its contact. As the motor accelerates the current diminishes sufficiently to cause relay D to close its contact 45, and since contact 50 on relay F will also then be closed, a circuit for coil 55 of switch B will be made as follows: from line I, by wire 30, contacts 31 and 32 on switch A, by wire 46, junction point 47, by wire 52, through contact 50, now closed, of relay F, by wire 53, through contact 45 of relay D, by wire 54, through coil 55 of switch B, by wire 56, by wire 97, contacts 98 and 99 of switch A, to line II. Switch B is thereby energized and opens its contacts 42 and 43 and then closes its contacts 57, 58 and 59. The opening of contacts 42 and 43 opens the star connection of the auto-transformers T¹, T² and T³ and the subsequent closing of contacts 57, 58 and 59 short circuits the portions of the various auto-transformers that were in series with the motor during the starting period. During the interval of time between the opening of contacts 42 and 43 and the closing of contacts 57, 58 and 59 on switch B, the portions of the auto-transformers that were in circuit at starting remain in series with the three lines to the motor, but act as inductances. For example, when the switch B is operating, the circuits to the motor are as traced above, but, after switch B is closed, the circuit from line I to the motor is by wire 30, contacts 31 and 32 of switch A, by wire 33, junction points 34, by wire 60, contact 57 of switch B, by wire 61, junction point 37, by wire 16 to switch C and thence to the motor. Similar circuits may be traced for the other two lines to the motor. The motor is then running on full line voltage.

It is to be noted that switch F prevents a momentary energization of coil 55 of switch B. Were relay D alone used, a circuit would be closed through coil 55, whenever switch A was closed, until relay D had operated to open its contact. By providing switch F, however, with a time interval for closing its contacts sufficient to permit of the contact of relay D opening, no energization of coil 55 of switch B can take place until the current in the motor has fallen to the predetermined value at which relay D is constructed to operate. After switch B has operated to close its contacts 57, 58 and 59, switch D is rendered unresponsive to changes in the current to the motor since its coil is short circuited by contacts 58 of switch B.

If switch S is now opened, the coil circuit of switch A is broken and this switch opens its contacts, disconnecting the motor from the supply lines. As a result of the opening of switch A, the coils of switches B and F are de-energized and these switches open their contacts. All switches are then in position for another operation of the motor by means of switch S.

The apparatus and connections described above in connection with the starting of the motor while maintaining torque thereon during the starting period, is the subject matter of our copending application Serial Number 677,256, filed November 27, 1923.

Assuming that the switch S is closed so that the blade 23 contacts with contact 62 for high speed operation and rotation of the motor in the other direction, a circuit for the coil 71 of switch C is completed as follows: from line I, by wire 19, junction point 20, by wire 21, contact 22, switch blade 23 and contact 62 of switch S, by wire 63, junction point 64, by wire 65, contacts 66 and 67 of switch A, by wire 68, junction point 69, by wire 70, coil 71 of switch C, by wire 72, junction point 73, by wire 74 to line III. Switch C is thereby energized and opens its bottom contacts and closes its top contacts, thereby re-connecting the motor windings for high speed and for the other direction of rotation. The operation of switch C opens its contacts 26 and 27 and closes its contact 27 with contact 75, thereby completing circuit for coil of switch A as follows: from line I, by wire 19, junction point 20, by wire 21, contact 22, switch blade 23, and contact 62 of switch S, by wire 76, contacts 75 and 27, now closed, of switch C, by wire 28, coil 29 to line III.

Switch A then closes its contacts completing a circuit to the motor as follows: from line I, by wire 30, through contacts 31 and 32 of switch A, by wire 33, by wire 35, through part of auto-transformer winding $T^1$ to tap 36, by wire 16, contacts 12 and 1 of switch C, by wires 85 and 86 to the two ends of stator windings $M^1$, by wire 100, contacts 6 and 5 of switch C, by wire 101 to a point in stator windings $M^6$, from the ends of windings $M^6$ through parallel paths, one of which is by wire 90, windings $M^4$, to wire 102, and the other by wire 91, contacts 11 and 2 of switch C, by wire 103, through winding $M^4$ to wire 102, by wire 102, contacts 7 and 8 of switch C, by wire 104, to a point in windings $M^2$, from the ends of windings $M^2$ by wires 94 and 95 to contacts 13 and 3 of switch C, by wire 17, through part of auto-transformer $T^2$, by wire 96, through coil 44 of relay D, by wire 97, through contacts 98 and 99 to line II. The other two phases to the motor may be similarly traced. The operation of switches D, F and B follows the closing of switch A, as first described for the operation of switch S.

When the switch S is closed as just described above, a circuit is completed for the coil of the holding relay E, as follows: from line I to junction point 64 as previously traced, by wire 76, coil 77 of switch E, by wire 78, junction point 73, by wire 74 to line III. The closing of this circuit causes the switch E to close its contact, thereby completing a holding circuit for the coil of switch C as follows: from line I, by wire 19, junction point 20, by wire 79, resistance R, junction point 80, by wire 81, contact 82 of switch E, junction point 69, by wire 70, coil 71 of switch C, to line III as previously traced. When the switch A closes, auxiliary contacts on this switch make a holding circuit for the coil of switch C and break the circuit originally completed through switch S for the coil of switch C. The auxiliary making contact on switch A shunts the contact 82 of switch E establishing the following circuit for coil of switch C: from line I to junction point 80 as previously traced, by wire 83, contacts 84 and 67, now closed, of switch A, by wire 68, junction point 69, and through coil 71 of switch C as previously traced. When the switch A is completely closed, contacts 84 and 67 are together and contacts 67 and 66 are open, thereby breaking the circuit originally completed for the coil of switch C. Contacts 66, 67 and 84 of switch A are so made that contact 84 closes with contact 67 before contacts 67 and 66 break.

The switch E and the auxiliary making contacts 84 and 67 on switch A, as stated above, establish the same holding circuit. The switch E is used to insure that switch C will not open after once closing, as long as the switch S is closed on contact 62.

The motor is now running on full line voltage with switches A, F, B, C and E energized and switch D de-energized. If switch S is then opened, the coil circuits of switches A and E are opened simultaneously, the opening of switch A disconnecting the supply lines from switch C and the motor. When switches A and E open the coil circuit of switch C is broken allowing this latter switch to open its top contacts and make its bottom contacts. All switches are then in position for another operation of the motor by means of switch S.

Assume that the switch S is closed on contact 24 and that the motor is running on full line voltage at low speed and in one direction of rotation, and that this switch S is then thrown quickly to the closed position on contact 62 to obtain high speed and opposite rotation of the motor. As soon as switch S is opened, switch A will open, disconnecting the supply lines from switch C and the motor. Switches B, D and F also open. When switch S closes on contact 62, the first operation is the energization of the coil 71 of switch C, which reconnects the motor for high speed operation and opposite rotation. Switch A then closes and power is applied to first stop the motor and then reverse it. If the current is sufficiently high during this period, switch B does not operate. However, in such event, as the motor accelerates in the reverse direction, switch B acts and the motor then runs on full voltage at high speed. At each subsequent throwing over of switch S, the motor will be stopped and reversed, running first in one direction and then in the other at the different speeds.

We wish to point out that no current is broken or made by switch C since it can move from either position to the other only when switch A is open. Also, that the drawing of excessive current from the line is prevented, due to the interposition of autotransformers in the motor leads during the period of retardation and acceleration.

We have found that with our invention a sixty horse power induction motor may be stopped in three quarters of a revolution and very quickly brought to full speed in the opposite direction without damage to the motor or apparatus driven thereby and without injurious arcing at any contacts.

We claim:

1. A multi-speed alternating current motor control system comprising an alternating current motor having its windings arranged to be alternatively connected through one set of connections for one speed in one direction of rotation and through another set of connections for a different speed in the other direction of rotation, means for selectively connecting the motor to the line through one or the other set of connections, and means for preventing a change in the motor winding connections while the motor is connected to the line.

2. A multi-speed alternating current motor control system comprising an alternating current motor having its windings arranged to be alternatively connected through one set of connections for one speed in one direction of rotation and through another set of connections for a different speed in the other direction of rotation, a motor control switch for connecting the line to one of said sets of connections when in one position and to the other of said sets of connections when in another position, means for causing said motor control switch to move from one position to another, and means for preventing the functioning of said causing means while the line current is flowing to said switch.

3. A multi-speed alternating current motor control system comprising an alternating current motor having its windings arranged to be alternatively connected through one set of connections for one speed in one direction of rotation and through another set of connections for a different speed in the other direction of rotation, a motor control switch for connecting the line to one of said sets of connections when in one position and to the other of said sets of connections when in another position, a main line switch for controlling the supply of current to said motor control switch, means inoperative when the main line switch is closed for causing said motor control switch to move from one position to another, and means for rendering said causing means operative when the main line switch is open.

4. A multi-speed alternating current motor, a motor control switch for determining the direction and speed of the motor, a main line switch for controlling the supply of current from the line to said motor control switch, electromagnetic means for governing the position of said motor control switch, electromagnetic means for governing the position of said main line switch, means for preventing the operation of the motor control switch while the main line switch is closed, and a master switch for controlling the supply of current to the motor control governing means and the main line switch governing means.

5. A multi-speed alternating current motor control system comprising an alternating current motor having its windings arranged to be alternatively connected through one set of connections for one speed in one direction of rotation and through another set of connections for a different speed in the other direction of rotation, an auto-transformer having a coil connected to the line, means for selectively connecting the motor through one or the other set of connections to an intermediate voltage point of the coil of said transformer, and means for thereafter discontinuing the transformer action of said coil, momentarily continuing the supply of current from the line through said intermediate voltage point of the coil and then directly connecting the motor through the selected set of said connections to the line.

In testimony whereof, we have signed our names to this specification.

DAVID L. LINDQUIST.
JACOB D. LEWIS.